(12) United States Patent
Coca et al.

(10) Patent No.: US 6,376,597 B1
(45) Date of Patent: Apr. 23, 2002

(54) PIGMENT DISPERSIONS CONTAINING DISPERSANTS HAVING PENDENT HYDROPHILIC POLYMERIC SEGMENTS PREPARED BY CONTROLLED RADICAL POLYMERIZATION

(75) Inventors: Simion Coca, Pittsburgh; Gregory J. McCollum, Gibsonia; James B. O'Dwyer, Valencia; Brian E. Woodworth, Mars, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/464,915

(22) Filed: Dec. 16, 1999

(51) Int. Cl.$^7$ .............................................. C08L 51/00
(52) U.S. Cl. ...................................................... 524/504
(58) Field of Search ......................................... 524/504

(56) References Cited

U.S. PATENT DOCUMENTS

| | | | |
|---|---|---|---|
| 4,508,880 A | 4/1985 | Webster | 526/190 |
| 4,656,226 A | 4/1987 | Hutchins et al. | 525/93 |
| 4,755,563 A | 7/1988 | West | 525/287 |
| 4,812,517 A | 3/1989 | West | 525/94 |
| 5,085,698 A | 2/1992 | Ma et al. | 106/20 |
| 5,219,945 A | 6/1993 | Dicker et al. | 525/276 |
| 5,221,334 A | 6/1993 | Ma et al. | 106/20 D |
| 5,231,131 A * | 7/1993 | Chu | 524/504 |
| 5,272,201 A | 12/1993 | Ma et al. | 524/505 |
| 5,478,886 A | 12/1995 | Kim | 525/94 |
| 5,502,113 A * | 3/1996 | Antonelli | 525/287 |
| 5,589,522 A * | 12/1996 | Beach | 523/160 |
| 5,656,071 A * | 8/1997 | Kappele | 106/31.76 |
| 5,719,204 A * | 2/1998 | Beach | 523/161 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,859,113 A | 1/1999 | McIntyre et al. | 524/460 |
| 5,955,532 A * | 9/1999 | Chang | 524/504 |
| 6,087,416 A * | 7/2000 | Pearlstine | 523/160 |
| 6,117,921 A * | 9/2000 | Ma | 523/161 |

FOREIGN PATENT DOCUMENTS

| | | |
|---|---|---|
| WO | WO 96/30421 | 10/1996 |
| WO | WO 97/18247 | 5/1997 |
| WO | WO 98/01480 | 1/1998 |
| WO | WO 98/40415 | 9/1998 |

* cited by examiner

*Primary Examiner*—Paul R. Michl
(74) *Attorney, Agent, or Firm*—William J. Uhl; James R. Franks

(57) ABSTRACT

A pigment dispersion comprising pigment, an aqueous carrier selected from water and a mixture of water and at least one organic solvent, and a pigment dispersant is described. The pigment dispersant is prepared by polymerizing (i) at least one prepolymer having a radically polymerizable group, and (ii) at least one second monomer. The prepolymer is prepared by controlled radical polymerization, e.g., atom transfer radical polymerization, of at least one radically polymerizable first monomer. The second monomer forms a polymeric backbone segment of the pigment dispersant, and the prepolymer forms polymeric segments that are pendent to the backbone. The backbone segment of the pigment dispersant in hydrophobic, while at least a portion of each pendent polymeric segment is hydrophilic.

26 Claims, 1 Drawing Sheet

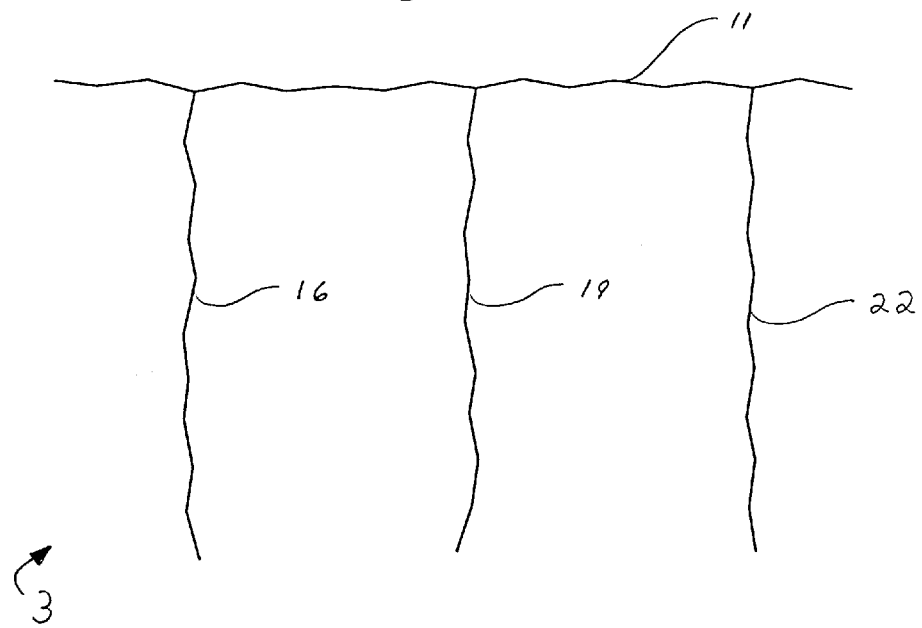
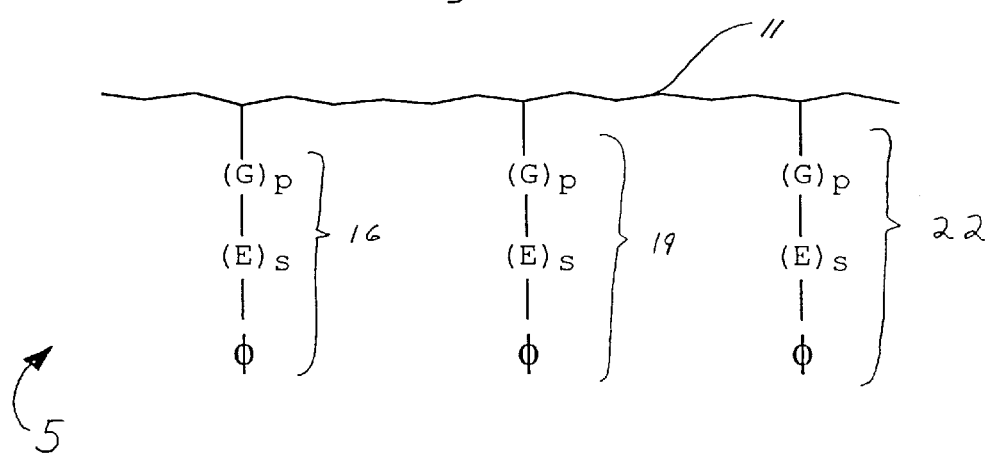

PIGMENT DISPERSIONS CONTAINING DISPERSANTS HAVING PENDENT HYDROPHILIC POLYMERIC SEGMENTS PREPARED BY CONTROLLED RADICAL POLYMERIZATION

FIELD OF THE INVENTION

The present invention relates to pigment dispersions containing pigment, an aqueous carrier, and a pigment dispersant prepared by polymerizing (i) a prepolymer having a radically polymerizable group and (ii) a radically polymerizable monomer. The prepolymer is prepared by controlled radical polymerization, and has well defined polymer chain structure, molecular weight and molecular weight distribution. Monomer (ii) forms the polymeric backbone of the dispersant, and prepolymer (i) forms polymeric segments pendent to the backbone of the dispersant. The backbone of the pigment dispersant is hydrophobic, and at least a portion of each pendent polymeric segment is hydrophilic.

BACKGROUND OF THE INVENTION

Pigmented coating compositions are used in a wide variety of applications including, for example, corrosion resistant primers and decorative topcoats in the automotive, industrial and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an aqueous carrier medium.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Reducing the environmental impact of pigmented coatings compositions, in particular that associated with emissions into the air of volatile organics during their use, has been an area of ongoing investigation and development in recent years. Accordingly, interest in aqueous pigment dispersions has been increasing due, in part, to the inherently low volatile organic content (VOC) of the aqueous pigmented coatings prepared therefrom, which can significantly reduce air emissions during the application process.

Pigment dispersants used in aqueous pigment dispersions are preferably compatible with both the aqueous carrier medium and the hydrophobic surfaces of the pigment particles. Such a combination of disparate properties can be achieved with a pigment dispersant having distinct hydrophobic and hydrophilic polymeric segments, i.e., having well defined polymer chain architecture. A wide variety of radically polymerizable monomers, such as methacrylate and acrylate monomers, are commercially available and can provide a wide range of properties including, for example, hydrophilic and hydrophobic properties. The use of conventional, i.e., non-living or free, radical polymerization methods to synthesize pigment dispersants provides little control over molecular weight, molecular weight distribution and, in particular, polymer chain structure. Aqueous pigment dispersions containing pigment dispersants prepared by conventional non-living radical polymerizations, typically have poor stability, e.g., the pigments re-agglomerate and/or settle out of the dispersion, and are unsuitable for the preparation of aqueous pigmented coatings compositions.

The continued development of aqueous pigment dispersions that are stable and suitable for the preparation of aqueous pigmented coating compositions is desirable. In particular, it would be desirable to develop aqueous pigment dispersions that comprise pigment dispersants having well defined polymer chain architecture in which distinct hydrophilic and hydrophobic polymer segments are present.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

SUMMARY OF THE INVENTION

In accordance with the present invention, there is provided a pigment dispersion comprising:
  (a) pigment;
  (b) an aqueous carrier selected from water and a mixture of water and at least one organic solvent; and
  (c) a pigment dispersant prepared by polymerizing a composition comprising,
    (i) at least one prepolymer having a radically polymerizable group, said prepolymer being prepared by controlled radical polymerization of at least one radically polymerizable ethylenically unsaturated first monomer, said prepolymer having a polydispersity index of less than 2.0; and
    (ii) at least one radically polymerizable ethylenically unsaturated second monomer to produce a polymeric backbone segment in said pigment dispersant; wherein said prepolymer after polymerization with (c)(ii) is in the form of polymeric segments pendent to said polymeric backbone segment, at least a portion of each pendent polymeric segment is hydrophilic, and the polymeric backbone segment is hydrophobic.

The features that characterize the present invention are pointed out with particularity in the claims which are annexed to and form a part of this disclosure. These and other features of the invention, its operating advantages and the specific objects obtained by its use will be more fully understood from the following detailed description and the accompanying drawings in which pigment dispersants useful in embodiments of the invention are illustrated and described.

Other than in the operating examples, or where otherwise indicated, all numbers or expressions referring to quantities of ingredients, reaction conditions, etc, used in the specification and claims are to be understood as modified in all instances by the term "about."

BRIEF DESCRIPTION OF THE DRAWINGS

FIG. 1 is a diagrammatic representation of a pigment dispersant useful in the pigment dispersions of the present invention; and FIG. 2 is a diagrammatic representation of a pigment dispersant similar to that depicted in FIG. 1 in which the polymer chain architecture of the polymeric segments pendent to the polymeric backbone segment are shown in further detail.

In FIGS. 1 and 2, like reference numerals represent the same structural segments.

DETAILED DESCRIPTION OF THE INVENTION

Pigment dispersions according to the present invention comprise one or more pigment dispersants which can be described generally as having a comb-like architecture, i.e., having a polymeric backbone segment with at least one polymer segment or tooth pendent therefrom. The polymeric backbone segment of the pigment dispersant is hydrophobic and at least a portion of each pendent polymeric segment is hydrophilic. Preferably, at least the terminal portion of each pendent polymeric segment, i.e., that portion which is furthest from the backbone, is hydrophilic. While not intending to be bound by any theory, it is believed that the hydrophobic backbone of the pigment dispersant is associated with the pigment, while the hydrophilic teeth are associated with the aqueous carrier of the pigment dispersion.

As used herein and in the claims, the terms "hydrophobic" and "hydrophilic" are relative to each other. The backbone segment of the pigment dispersant is hydrophobic, i.e., it is more hydrophobic than the pendent polymeric segments. Correspondingly, at least a portion of each pendent polymeric segment is hydrophilic, i.e., that portion is more hydrophilic than the backbone segment.

A more quantitative measure of the hydrophobic or hydrophilic nature of a nonionic monomer residue can be obtained by using the following Formula-A: 100×(oxygen weight+ nitrogen weight)/(carbon weight). Monomer residues having calculated Formula-A values of greater magnitude are generally considered to be more hydrophilic than monomer residues having calculated Formula-A values of lesser magnitude. For example, the calculated Formula-A value is 67 for 2-hydroxyethyl methacrylate; 63 for methacrylamide; 53 for methyl methacrylate; 33 for butyl methacrylate; and 22 for 2-ethylhexyl methacrylate. Accordingly, an average Formula-A value can be calculated for a polymer chain segment by averaging the calculated Formula-A values for the monomer residues within that segment. In an embodiment of the present invention, the hydrophobic polymeric backbone segment of the pigment dispersant has a calculated average Formula-A value of from 10 to less than 55, e.g., from 10 to 40 or from 10 to 33, while the hydrophilic portion of each pendent polymeric segment has a calculated average Formula-A value of from 55 to 133. The difference between the calculated Formula-A values of the hydrophilic portion of each pendant polymeric segment and the hydrophobic polymeric backbone segment of the pigment dispersant is typically at least 10, e.g., at least 25, and typically within the range of 10 to 40, inclusive of the recited values.

The hydrophobic polymeric backbone segment of the pigment dispersant typically does not contain ionic monomer residues. The hydrophilic portion of each pendent polymeric segment of the pigment dispersant may contain ionic monomer residues, nonionic monomer residues (e.g., having calculated Formula-A values of from 55 to 133) or a combination of ionic and nonionic monomer residues.

Preparation of the pigment dispersant involves the polymerization, e.g., non-living free radical polymerization, of at least one prepolymer having a radically polymerizable group, and at least one radically polymerizable ethylenically unsaturated second monomer. The prepolymer is prepared from the controlled radical polymerization of at least one-first monomer. The second monomer forms the polymeric backbone segment of the pigment dispersant while the prepolymer forms polymeric segments pendent from the backbone, i.e., the teeth of the comb-like pigment dispersant.

The first and second monomers may each be independently selected from vinyl monomers, allylic monomers, olefins and mixtures thereof. Classes of vinyl monomers from which each of the first and second monomers may be independently selected include, but are not limited to, (meth) acrylic acid, (meth)acrylates, (meth)acrylamide, N- and N,N-disubstituted (meth)acrylamides, vinyl aromatic monomers, vinyl halides and vinyl esters of carboxylic acids. As used herein and in the claims, by "(meth)acrylate" and like terms is meant methacrylates, acrylates and mixtures of methacrylates and acrylates.

Examples of $C_1$–$C_{20}$ alkyl (meth)acrylates (including linear or branched alkyls and cycloalkyls) from which each of the first and second monomers may be independently selected include, but are not limited to, methyl (meth) acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth) acrylate, cyclohexyl (meth)acrylate, 3,3,5-trimethylcyclohexyl (meth)acrylate and isocane (meth) acrylate. Examples of oxirane functional (meth)acrylates from which each of the first and second monomers may be independently selected include, but are not limited to, glycidyl (meth)acrylate, 3,4-epoxycyclohexylmethyl(meth) acrylate, and 2-(3,4-epoxycyclohexyl)ethyl(meth)acrylate. Hydroxy alkyl (meth)acrylates having from 2 to 4 carbon atoms in the alkyl group from which each of the first and second monomers may be independently selected include, but are not limited to, hydroxyethyl (meth)acrylate, hydroxypropyl (meth)acrylate and hydroxybutyl (meth)acrylate. Examples of monomers having more than one (meth) acryloyl group, from which each of the first and second monomers may be independently selected, include, but are not limited to (meth)acrylic anhydride, diethyleneglycol bis(meth)acrylate, 4,4'-isopropylidenediphenol bis(meth) acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers from which each of the first and second monomers may be selected include, but are not limited to, styrene, p-chloromethylstyrene, divinyl benzene, vinyl naphthalene and divinyl naphthalene. Vinyl halides from which each of the first and second monomers may be independently selected include, but are not limited to, vinyl chloride and vinylidene fluoride. Vinyl esters of carboxylic acids from which each of the first and second monomers may be independently selected include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which each of the first and second monomers may be independently selected include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula I,

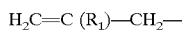

$$H_2C=C(R_1)-CH_2-$$  I wherein $R_1$ is hydrogen, halogen or a $C_1$ to $C_4$ alkyl group. Most commonly, $R_1$ is hydrogen or methyl and consequently general formula I represents the (meth)allyl radical (i.e., the methallyl or allyl radical). Examples of allylic monomers from which each of the first and second monomers may be independently selected include, but are not limited to: (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which each of the first and second monomers may be independently selected include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, the hydrophobic polymeric backbone segment of the pigment dispersant contains residues of monomers selected independently from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates, e.g., including those as previously recited herein; aromatic (meth) acrylates, e.g., phenyl (meth)acrylate, p-nitrophenyl (meth) acrylate and benzyl (meth)acrylate; polycyclicaromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth) acrylamides, e.g., N,N-dimethyl (meth)acrylamide, N,N-diethyl (meth)acrylamide and N,N-dioctyl (meth) acrylamide; maleimide; N-substituted maleimides; and mixtures thereof. Examples of N-substituted maleimides include, but are not limited to, N-($C_1$–$C_{20}$ linear or branched alkyl) maleimides, e.g., N-methyl maleimide, N-tertiary-butyl maleimide, N-octyl maleimide and N-icosane maleimide; N-($C_3$–$C_8$ cycloalkyl) maleimides, e.g., N-cyclohexyl maleimide; and N-(aryl) maleimides, e.g., N-phenyl maleimide, N-($C_1$–$C_9$ linear or branched alkyl substituted phenyl) maleimide, N-benzyl maleimide and N-($C_1$–$C_9$ linear or branched alkyl substituted benzyl) maleimide.

The oxirane functional monomer residue of the polymeric backbone segment that is reacted with a carboxylic acid, may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

Each pendent hydrophilic polymeric segment of the pigment dispersant may contain nonionic moieties, ionic moieties and combinations thereof. In an embodiment of the present invention, each pendent polymeric segment contains residues of monomers selected from, for example, poly (alkylene glycol) (meth)acrylates; $C_1$–$C_4$ alkoxy poly (alkylene glycol) (meth)acrylates; hydroxyalkyl (meth) acrylates having from 2 to 4 carbon atoms in the alkyl group; N-(hydroxy $C_1$–$C_4$ alkyl) (meth)acrylamides (e.g., N-hydroxymethyl (meth)acrylamide and N-(2-hydroxyethyl) (meth) acrylamide); N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers, amine functional monomers; salts of amine functional monomers; and mixtures thereof.

Poly(alkylene glycol) (meth)acrylates and $C_1$–$C_4$ alkoxy poly(alkylene glycol) (meth)acrylates that may be used to prepare the pendent hydrophilic polymeric segments of the pigment dispersant are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth) acrylate may be transesterified with a $C_1$–$C_4$ alkoxy poly (alkylene glycol), e.g., methoxy poly(ethylene glycol). Examples of preferred poly(alkylene glycol) (meth)acrylates and $C_1$–$C_4$ alkoxy poly(alkylene glycol) (meth)acrylates include, poly(ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly(alkylene glycol) (meth)acrylate is methoxy poly(ethylene glycol) 550 methacrylate monomer from Sartomer Company, Inc.

Examples of carboxylic acid functional monomers that may be present as monomer residues in the hydrophilic pendent polymeric segments of the pigment dispersant include, but are not limited to, (meth)acrylic acid, maleic acid, fumeric acid and undecylenic acid. The hydrophilic pendent polymeric segments may contain precursors of carboxylic acid functional monomer residues that are converted to carboxylic acid residues after completion of the polymerization, e.g., maleic anhydride and di($C_1$–$C_4$ alkyl) maleates. For example, residues of maleic anhydride can be converted to ester/acid residues or amide/acid residues by art-recognized reactions with alcohols or primary amines, respectively. Salts of carboxylic acid functional monomers that may be present as monomer residues in the hydrophilic pendent polymeric segments include, for example, salts of (meth)acrylic acid and primary, secondary or tertiary amines, such as, butyl amine, dimethyl amine and triethyl amine.

Amine functional monomers that may be present as monomer residues in the hydrophilic pendent polymeric segments of the pigment dispersant include, for example, amino($C_2$–$C_4$ alkyl) (meth)acrylates, e.g., 2-aminoethyl (meth)acrylate, 3-aminopropyl (meth)acrylate and 4-aminobutyl (meth)acrylate; N-($C_1$–$C_4$ alkyl)amino($C_2$–$C_4$ alkyl) (meth)acrylates, e.g., N-methyl-2-aminoethyl (meth) acrylate; and N,N-di($C_1$–$C_4$ alkyl)amino($C_2$–$C_4$ alkyl) (meth)acrylates, e.g., N,N-dimethyl-2-aminoethyl (meth) acrylate. The hydrophilic pendent polymeric segments of the pigment dispersant may also contain residues of salts of amine functional monomers, e.g., salts of those amine functional monomers as recited previously herein. Salts of the amine functional monomer residues may be formed by mixing a carboxylic acid, e.g., lactic acid, with the pigment dispersant after completion of polymerization.

In an embodiment of the present invention, the hydrophilic pendent polymeric segments of the pigment dispersant each independently contain residues of carboxylic acid functional monomers selected from (meth)acrylic acid, maleic anhydride, maleic acid, di($C_1$–$C_4$ alkyl) maleates, and mixtures thereof. In a still further embodiment of the present invention, the hydrophilic pendent polymeric segments of the pigment dispersant each independently contain residues of amine functional monomers selected from amino ($C_2$–$C_4$ alkyl) (meth)acrylates, N-($C_1$–$C_4$ alkyl)amino ($C_2$–$C_4$ alkyl) (meth)acrylates, N,N-di($C_1$–$C_4$ alkyl)amino ($C_2$–$C_4$ alkyl) (meth)acrylates and mixtures thereof.

The hydrophilic pendent polymeric segments of the pigment dispersant may also contain cationic moieties selected from ammonium, sulphonium and phosphonium. Ammonium, sulphonium and phosphonium moieties may be introduced into the pendent polymeric segments of the pigment dispersant by means known to the skilled artisan. For example, when the pendent segments contain residues of N,N-dimethyl-2-aminoethyl (meth)acrylate, the N,N-dimethylamino moieties may be converted to ammonium moieties by mixing an acid, e.g., lactic acid, with the pigment dispersant.

When the pendent polymeric segments contain residues of oxirane functional monomers, such as glycidyl (meth) acrylate, the oxirane groups may be used to introduce sulphonium or phosphonium moieties into the pendent polymeric segments. Sulphonium moieties may be introduced into the pendent segments by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the pendent segments.

The prepolymer that forms the pendent polymeric segments of the pigment dispersant is prepared by controlled or living radical polymerization of at least one radically polymerizable ethylenically unsaturated first monomer, and has a polydispersity index of less than 2.0, e.g., less than 1.8 or less than 1.5. As used herein and in the claims, the term "controlled radical polymerization," and related terms, e.g., "living radical polymerization," refers to those methods of radical polymerization that provide control over the molecular weight, polymer chain architecture and polydispersity of the resulting polymer. A controlled or living radical polymerization is also described as a chain-growth polymerization that propagates with essentially no chain transfer and essentially no chain termination. The number of polymer chains formed during a controlled radical polymerization is often nearly equal to the number of initiators present at the beginning of the reaction, and each polymer chain typically contains a residue of the initiator.

In an embodiment of the present invention, the prepolymer is prepared by atom transfer radical polymerization (ATRP) of the first monomer in the presence of an initiator having a radically transferable group, e.g., a radically transferable halide. The ATRP prepared prepolymer contains a residue of or derived from the initiator.

The ATRP process can be described generally as comprising: polymerizing one or more radically polymerizable monomers in the presence of an initiation system; forming a polymer; and isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in international patent publication WO 98/40415 and U.S. Pat. Nos. 5,807,937, 5,763,548 and 5,789,487.

In preparing the prepolymer by ATRP, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, nitrites, ketones, phosphonates and mixtures thereof, each having at least one radically transferable group, which is typically a halide. The initiator may also be substituted with functional groups, e.g., oxyranyl groups, such as glycidyl groups. Additional useful initiators and the various radically transferable groups that may be associated with them (e.g., cyano, cyanato, thiocyanato and azido groups) are described in U.S. Pat. No. 5,807,937 at column 17, line 4 through column 18, line 28.

Preferably, the ATRP initiator may be selected from the group consisting of halomethane, 1-halo-2,3-epoxypropane, methanesulfonyl halide, methanesulfenyl halide, $C_1$–$C_6$-alkyl ester of 2-halo-$C_2$–$C_6$-carboxylic acid, di($C_1$–$C_6$-alkyl)-2-halo-2-methyl malonate and mixtures thereof. A preferred ATRP initiator is diethyl-2-bromo-2-methyl malonate.

Catalysts that may be used in the ATRP preparation of the prepolymer, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula II, $$TM^{n+}X_n \qquad \qquad II$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)$Cl_2$ when Cu(I)Cl is used. Additional catalysts useful in preparing the prepolymer are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the prepolymer, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines;

porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing prepolymer are described in U.S. Pat. No. 5,807,937 at column 18, line 57 through column 21, line 43.

In the ATRP preparation of the prepolymer, the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the prepolymer can be directly related to the relative concentrations of initiator and monomer(s), the molar ratio of initiator to monomer is an important factor in prepolymer preparation. The molar ratio of initiator to monomer is typically within the range of $10^{-4}$:1 to 0.5:1, for example, $10^{-3}$:1 to $5 \times 10^{-2}$:1.

In preparing the prepolymer by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The prepolymer may be prepared in the absence of solvent, i.e., by means of a bulk polymerization process. Generally, the prepolymer is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the prepolymer is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

The ATRP transition metal catalyst and its associated ligand are typically separated or removed from the prepolymer prior to its polymerization with the second monomer. Removal of the ATRP catalyst is achieved using known methods, including, for example, adding a catalyst binding agent to the a mixture of the prepolymer, solvent and catalyst, followed by filtering. Examples of suitable catalyst binding agents include, for example, alumina, silica, clay or a combination thereof. A mixture of the prepolymer, solvent and ATRP catalyst may be passed through a bed of catalyst binding agent. Alternatively, the ATRP catalyst may be oxidized in situ, the oxidized residue of the catalyst being retained with the prepolymer.

The prepolymer used in the preparation of the pigment dispersant typically has a number average molecular weight (Mn) of at least 250, preferably at least 1000, and more preferably at least 2000. The number average molecular weight of the prepolymer is typically less than 25,000, preferably less than 15,000 and more preferably less than 10,000. The number average molecular weight of the prepolymer may range between any combination of these values, inclusive of the recited values.

The radically polymerizable group of the prepolymer may be selected from (meth)acryloyl, allyl, substituted allyl, vinyl and thiol (—SH). The prepolymer may contain more than one radically polymerizable group, e.g., 2, 3, 4 or 5 radically polymerizable groups. When the prepolymer contains more than one radically polymerizable group, the radically polymerizable groups are preferably together present in a block of radically polymerizable groups.

The radically polymerizable group of the prepolymer is typically pendent from and may be located at any point along the polymer chain of the prepolymer. Preferably, the radically polymerizable group is located at a terminal or near terminal polymer chain position that is furthest from the position of the initiator residue of the prepolymer. That part of the prepolymer chain containing a residue of the initiator is generally referred to as the tail of the prepolymer, and the terminal position furthest from the tail is referred to as the head. The radically polymerizable group may be incorporated into the polymer chain of the prepolymer either (i) during the course of the controlled radical polymerization or (ii) by means of a post-reaction performed on the prepolymer.

Monomers having more than one radically polymerizable group (preferably having two such groups) are typically used to incorporate the radically polymerizable group into the prepolymer during the course of its preparation by controlled radical polymerization. Under the conditions of the controlled radical polymerization process used to prepare the prepolymer, the polyfunctional monomer preferably has (a) an ethylenically unsaturated group that is readily polymerizable, and (b) a second ethylenically unsaturated group that is not readily polymerizable. Allyl groups and vinyl groups, for example, are not readily polymerizable in atom transfer radical polymerizations relative to (meth) acryloyl groups. When the prepolymer is prepared by means of ATRP, preferred polyfunctional monomers include, for example, allyl or substituted allyl (meth)acrylate and vinyl (meth)acrylate. When allyl (meth)acrylate is used in the ATRP preparation of the prepolymer, the radically polymerizable group of the prepolymer is an allyl group. When vinyl (meth)acrylate is used in the ATRP preparation of the prepolymer, the radically polymerizable group of the prepolymer is a vinyl group.

A particularly desirable aspect of controlled radical polymerization is the control it provides over the polymer chain architecture of the prepolymer. The polymer chain architecture of a polymer refers to the position of different monomer residues within the polymer chain or a segment of the polymer chain. Examples of polymer chain architectures include random, gradient, alternating and block polymer chain architectures, which will be discussed in further detail below.

The position or location of monomer residues along the polymer chain is typically determined by the order in which the monomers are fed into the reaction vessel during the preparation of the prepolymer by controlled radical polymerization. When more than one monomer species is fed into the reaction vessel at the same time, the order in which they are incorporated into the living polymer chain is determined by the relative reactivities of the monomer species. For example, when the radically polymerizable group is introduced into the prepolymer by means of a polyfunctional monomer, such as allyl (meth)acrylate, the polyfunctional monomer is preferably the last monomer fed into the reaction vessel. The prepolymer preferably contains a single radically polymerizable group, but may also contain more than one such group, e.g., a terminal block containing 2, 3, 4 or 5 radically polymerizable groups.

The radically polymerizable group may also be incorporated into the prepolymer by means of a post-reaction. In an embodiment of the present invention, the prepolymer is prepared with a terminal head block containing from, for example, 1 to 5 residues of tert-butyl methacrylate, the tert-butyl carboxylate portions of which are then converted to carboxylic acid groups by methods known to the skilled artisan. The terminal carboxylic acid groups may then be reacted with glycidyl (meth)acrylate, thus introducing radically polymerizable (meth)acryloyl groups into the prepolymer.

When prepared by ATRP, the terminal head portion of the prepolymer typically contains a residue of the radically transferable group of the initiator, e.g., a halide or cyano group. This terminal residue of the radically transferable group can be substituted with or converted into a radically polymerizable group. In an embodiment of the present invention, the prepolymer contains a halide residue at the terminal head position, which can be substituted with an allyl group by means of an art recognized reaction involving allyl trialkylsilane, e.g., allyl trimethylsilane, under acidic conditions, e.g., in the presence of a titanium tetrahalide such as titanium tetrachloride. The terminal halide residue of the prepolymer may alternatively be substituted with a thiol group by reaction with sodium hydrosulfide (NaHS). In another embodiment of the present invention, the prepolymer contains a cyano group at the terminal head position, which can be converted to a carboxylic acid group by means known in the art. The terminal carboxylic acid group may then be reacted with glycidyl (meth)acrylate, thus introducing a (meth)acryloyal group at the terminal head position of the prepolymer.

When prepared by atom transfer radical polymerization, the prepolymer may be described with reference to the following representative general formula III, $$\Phi\text{-}(E)_s\text{-}(G)_p\text{-}(T)_q \qquad \text{III}$$

in which E is a hydrophilic residue of at least one radically polymerizable ethylenically unsaturated monomer. The residue E has nonionic moieties, ionic moieties and combinations thereof. In general formula III, E and G are different, and G is a residue of at least one radically polymerizable ethylenically unsaturated monomer. Also in general formula III, the symbol $\Phi$ is a residue of or derived from the ATRP initiator; T is the radically polymerizable group of the prepolymer or a residue of at least one radically polymerizable ethylenically unsaturated monomer containing the radically polymerizable group of the prepolymer; s, p and q represent average numbers of residues occurring in a block of residues; q is from 1 to 5; and s, p and q are each individually selected such that said prepolymer has a number average molecular weight of at least 250.

With reference to general formula III, E may be a residue of at least one monomer selected from poly(alkylene glycol) (meth)acrylates, $C_1$–$C_4$ alkoxy poly(alkylene glycol) (meth)acrylates, hydroxyalkyl (meth)acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth) acrylamides, carboxylic acid functional monomers, salts of carboxylic acid functional monomers, amine functional monomers, salts of amine functional monomers and mixtures thereof. Specific examples within these classes of monomers, of which E may be a residue, include those as recited previously herein. With further reference to general formula III, G may be a residue of a monomer selected from the group consisting of methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate and mixtures thereof.

In an embodiment of the present invention, E is a hydrophilic residue containing cationic moieties selected from ammonium, sulphonium and phosphonium. The ammonium, sulphonium and phosphonium residues that E may contain include those as recited previously herein. For example, E may be the residue of the carboxylic acid salt of N,N-dimethyl-2-aminoethyl (meth)acrylate, the reaction product of a residue of glycidyl (meth)acrylate and thiodiethanol in the presence of lactic acid, or the reaction product of a residue of glycidyl (meth)acrylate and a phosphine, such as tributyl phosphine, in the presence of lactic acid.

Each of E, G and T in general formula III may represent one or more types of monomer residues, while s, p and q represent the average total number of E, G and T residues occurring per block of E residues (E-Block), G residues (G-block) and T residues (T-block) respectively. When containing more than one type or species of monomer residue, the E, G and T blocks may each have at least one of random, block (e.g., di-block and tri-block), alternating and gradient architectures. For purposes of illustration, a G-block containing 6 residues of methyl methacrylate (MMA) and 6 residues of ethyl methacrylate (EMA), for which p is 12, may have di-block, tetra-block, alternating and gradient architectures as represented in general formulas IV, V, VI and VII.

Di-Block Architecture

—(MMA-MMA-MMA-MMA-MMA-MMA-EMA-EMA-EMA-EMA-EMA-EMA)—      IV

Tetra-Block Architecture

—(MMA-MMA-MMA-EMA-EMA-EMA-MMA-MMA-MMA-EMA-EMA-EMA)—      V

Alternating Architecture

—(MMA-EMA-MMA-EMA-MMA-EMA-MMA-EMA-MMA-EMA-MMA-EMA)—      VI

Gradient Architecture

—(MMA-MMA-MMA-EMA-MMA-MMA-EMA-EMA-MMA-EMA-EMA-EMA)—      VII

The E-block and T-block may each be described in a manner similar to that of the G-block. However, gradient architecture is not particularly applicative to the T-block, as it typically contains only 1 to 5 monomer residues.

The order in which monomer residues occur along a polymeric segment of the prepolymer is typically determined by the order in which the corresponding monomers are fed into the vessel in which the controlled radical polymerization is conducted. For example, the monomers that are incorporated as residues in the E-blocks of the prepolymer represented by general formula III are generally fed into the reaction vessel prior to those monomers that are incorporated as residues in the G-blocks.

During formation of the E- and G-blocks, if more than one monomer is fed into the reaction vessel at a time, the relative reactivities of the monomers typically determines the order in which they are incorporated into the living polymer arms of the pigment dispersant. Gradient sequences of monomer residues within the E- and G-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts s and p represent average total number of residues occurring in the respective E and G blocks. Typically, subscript s has a value of at least 1, and preferably at least 5 for general formula III. Also, subscript s has a value of typically less than 300, preferably less than 100, and more preferably less than 50 (e.g., 20) for general formula III. The value of subscript s may range between any combination of these values, inclusive of the recited values. Subscript p may be 0, or may have a value of at least 1, and preferably at least 5. Subscript p also typically has a value of less than 300, preferably less than 100, and more preferably less than 50 (e.g., 20). The value of subscript p may range between any combination of these values, inclusive of the recited values.

Symbol Φ of general formula III is or is derived from the residue of the initiator used in the ATRP preparation of the prepolymer, and is free of the radically transferable group of the initiator. For example, when the prepolymer is initiated in the presence of diethyl-2-bromo-2-methyl malonate, the symbol Φ, more specifically Φ-, is the residue represented by the following general formula VIII,

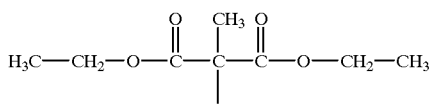

VIII

The symbol Φ may also be derived from the residue of the initiator. For example, when the prepolymer is initiated using epichlorohydrin the symbol Φ, more specifically Φ-, is

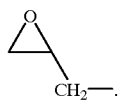

The 2,3-epoxy-propyl residue, The 2,3-epoxy-propyl residue can then be hydrolyzed to, for example, a 2,3-dihydroxypropyl residue.

In the course of its preparation by ATRP, the prepolymer will contain a residue of the radically transferable group of the initiator at its head (not shown in general formula III). The residue of the radically transferable group, e.g., a halide residue, can be substituted with or converted to a radically polymerizable group, e.g., a thiol or allyl group, as described previously herein, in which case symbol T of general formula III is the radically polymerizable group, and q is 1. When T is a residue of at least one radically polymerizable ethylenically unsaturated monomer containing the radically polymerizable group (e.g., allyl (meth)acrylate, vinyl (meth)acrylate or the adduct of glycidyl (meth)acrylate and 2-hydroxyethyl (meth)acrylate) q may be from 1 to 5, preferably 1 to 3, and more preferably 1 or 2.

When T is a residue of at least one radically polymerizable ethylenically unsaturated monomer containing the radically polymerizable group, such as allyl (meth)acrylate, the prepolymer will typically still contain a residue of the radically transferable group of the ATRP initiator at its head (not shown in general formula III). The residue of the radically transferable group may be (a) left on the prepolymer, (b) removed or (c) chemically converted to another moiety. The radically transferable group may be removed by substitution with a nucleophilic compound, e.g., an alkali metal alkoxylate. When the residue of the radically transferable group is a cyano group (—CN), it can be converted to an amide group or carboxylic acid group by methods known in the art.

In an embodiment of the present invention, when the radically transferable group is a halogen, the halogen can be removed from the prepolymer by means of a mild dehalogenation reaction. The reaction is typically performed as a post-reaction after the prepolymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated prepolymer with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound).

Not intending to be bound by any theory, it is believed, based on the evidence at hand, that the reaction between the halogen terminated prepolymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the prepolymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the prepolymer under mild conditions include those represented by the following general formula IX.

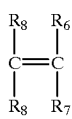

IX

In general formula IX, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the prepolymer and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between halogen terminated prepolymer and LRPEU compound, e.g., alpha-methyl styrene, is summarized in the following general scheme 1.

General Scheme 1

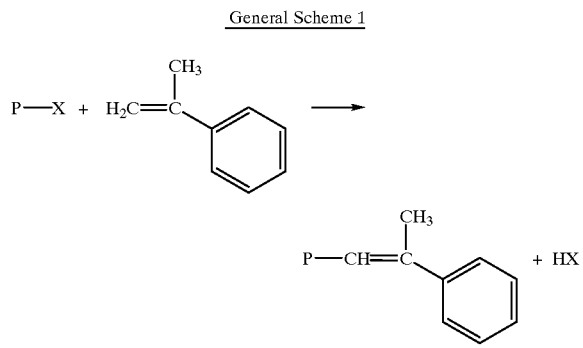

In general scheme 1, P-X represents the halogen terminated prepolymer.

The prepolymer having a radically polymerizable group and the second monomer are typically together polymerized by means of conventional non-living free radical polymerization techniques that are known to those of ordinary skill in the art. Such known non-living free radical polymerization methods typically make use of suitable initiators, which include organic peroxides, e.g., di(t-butyl) peroxide, and azo type compounds, e.g., 1,1'-azobis(isobutylnitrile). The free radical polymerization may optionally be performed in the presence of chain transfer agents, such as alpha-methyl styrene dimer and tertiary dodecyl mercaptan. In the non-living free radical polymerization, the total weight ratio of the prepolymer (c)(i) to the second monomer (c)(ii) is typically from 1:10 to 10:1, e.g., from 1:5 to 5:1 or from 1:3 to 3:1.

The polymerization of the prepolymer and second monomer is typically performed in the presence of a suitable solvent, which may be selected from those solvents as recited previously herein with regards to ATRP methods, e.g., toluene. If the polymerization of the prepolymer and second monomer is performed in the presence of a water insoluble solvent, such as toluene, the solvent is generally removed, e.g., by vacuum distillation, prior to incorporating the pigment dispersant into the pigment dispersion of the present invention. Upon removal of the water insoluble solvent from the pigment dispersant, it may be replaced with a water soluble organic solvent (e.g., 2-(butoxyethoxy) ethanol), water or a combination of water and a water soluble organic solvent.

Upon completion of the polymerization of the prepolymer and second monomer, the pigment dispersant has a comb-like architecture, which can be described in further detail with reference to drawing FIGS. 1 and 2. In FIG. 1, the pigment dispersant 3 has a hydrophobic polymeric backbone segment 11, and pendent polymeric segments 16, 19 and 22 (at least a portion of each being hydrophilic). As the polymerization of the prepolymer and the second monomer is non-living, the pigment dispersant will typically be composed of a mixture of comb-like polymers having polymeric backbone segments of varying molecular weights and varying numbers of pendent polymeric segments. In addition, the second monomer residues and the pendent prepolymer residues will be distributed randomly along the hydrophobic polymeric backbone segment of the pigment dispersant.

In FIG. 2, the pendent polymeric segments 16, 19 and 22 (which are residues of the prepolymer as represented in general formula III) of pigment dispersant 5 are shown in further detail. The symbol $\Phi$ and letters E, G, s and p have the same meanings as described previously herein with reference to general formula III. Each of E, G, $\Phi$, s and p of pendent polymeric segments 16, 19 and 22 of pigment dispersant 5 may be the same or different. The radically polymerizable group T of general formula III or residues thereof are not shown in FIG. 2.

Pigment dispersants useful in the pigment dispersions of the present invention can be described in further detail with reference to FIG. 2. In an embodiment of the present invention, the polymeric backbone segment 11 of pigment dispersant 5 contains residues of an adduct of glycidyl methacrylate and para-nitrobenzoic acid, the symbol $\Phi$ represents a residue of the ATRP initiator diethyl-2-bromo-2-methyl malonate, G is a residue of iso-butyl methacrylate, E is a residue of methoxy poly(ethylene glycol) methacrylate, and s and p are each independently from 1 to 20. In another embodiment of the present invention, the polymeric backbone segment 11 of pigment dispersant 5 contains residues of an adduct of glycidyl methacrylate and para-nitrobenzoic acid, the symbol $\Phi$ represents a residue of the ATRP initiator diethyl-2-bromo-2-methyl malonate, E is a residue of methoxy poly(ethylene glycol) methacrylate, s is from 1 to 20, and p is 0.

The pigment dispersant (c) is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, preferably less than 40 percent by weight, and more preferably less than 25 percent by weight, based on the total weight of the pigment dispersion. The amount of pigment dispersant (c) present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment (a) is typically present in the pigment dispersion of the present invention in an amount of at least 0.5 percent by weight, preferably at least 5 percent by weight, and more preferably at least 20 percent by weight, based on the total weight of the pigment dispersion. The pigment is also typically present in the pigment dispersion in an amount of less than 90 percent by weight, preferably less than 80 percent by weight, and more preferably less than 75 percent by weight, based on the total weight of the pigment dispersion. The amount of pigment present in the pigment dispersion may range between any combination of these values, inclusive of the recited values.

The pigment (a) and pigment dispersant (c) are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment (a) to pigment dispersant (c) is typically from 0.1:1 to 100:1, e.g., from 0.2:1 to 5:1 or from 0.5:1 to 2:1.

The pigment dispersion of the present invention also comprises an aqueous carrier selected from water and a mixture of water and at least one organic solvent (preferably a water soluble organic solvent). Classes of organic solvents that may be present in the aqueous carrier include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the aqueous carrier comprises a mixture of water and organic solvent, the aqueous carrier typically contains from 30 to 95 percent by weight of water, and from 5 to 70 percent by weight of organic solvent, e.g., from 60 to 95 percent by weight of water, and from 5 to 40 percent by weight of organic solvent. The percent weights are based on the total weight of the aqueous carrier.

The aqueous carrier (b) is typically present in the pigment dispersion of the present invention, in an amount of at least 5 percent by weight, preferably at least 15 percent by weight, and more preferably at least 30 percent by weight, based on the total weight of the pigment dispersion. The aqueous carrier is also typically present in the pigment dispersion in an amount of less than 99.4 percent by weight, preferably less than 80 percent by weight, and more preferably less than 60 percent by weight, based on the total weight of the pigment dispersion. The amount of aqueous carrier present in the pigment dispersion may range between any combination of these values, inclusive of the recited values.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coatings compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

Synthesis Examples A–C

Synthesis Examples A through C describe the preparation of a pigment dispersant that is used to prepare a pigment dispersion according to the present invention as described in the pigment dispersion Example.

EXAMPLE A

A prepolymer having a radically polymerizable allyl group was prepared by controlled radical polymerization from the ingredients enumerated in Table A. This prepolymer was copolymerized with methacrylate monomers to form a precursor of a pigment dispersant used in the present invention, as described in Example B.

TABLE A

| Ingredients | Parts by weight |
|---|---|
| Charge 1 | |
| toluene | 200 |
| magnesium silicate (a) | 15 |
| Charge 2 | |
| 2,2'-dipyridyl | 1.9 |
| copper powder (b) | 1.5 |
| p-toluenesulfonyl chloride | 25.2 |
| toluene | 40 |
| Charge 3 | |
| MPEG 550 MA monomer (c) | 583 |
| Charge 4 | |
| allyl methacrylate monomer | 95 |
| toluene | 70 |

TABLE A-continued

| Ingredients | Parts by weight |
|---|---|
| Charge 5 | |
| magnesium silicate (a) | 50 |

(a) MAGNESOL synthetic magnesium silicate obtained commercially from The Dallas Group of America.
(b) The copper powder had an average particle size of 25 microns, a density of 1 gram/cm³, and was obtained commercially from OMG Americas.
(c) MPEG 550 MA monomer is a methoxy poly(ethylene glycol) methacrylate monomer from Sartomer Company, Inc.

Charge 1 was added to a 2 liter 4-necked flask equipped with a Dean Stark trap, motor driven stainless steel stir blade, water cooled condenser, and a heating mantle and thermometer connected through a temperature feed-back control device. A dry nitrogen sweep was passed continuously through the flask throughout the course of the reaction. The contents of the flask were heated to 100° C. and held for 1 hour. The contents of the flask were cooled to 80° C., Charge 2 was added, and the solution was held for 1.25 hours at 80° C. Charge 3 was then added over a 30 minute time period and the reaction was held for 4.0 hours at 80° C. The reaction was then cooled to 70° C., Charge 4 was added dropwise over 30 minutes followed by a 1.5 hour hold at 70° C. The reaction solution was then cooled to room temperature and Charge 5 was added followed by filtration through a cake of MAGNESOL synthetic magnesium silicate. The solvent was removed under vacuum and 2-butoxyethanol was added to a total solids level of 59.5 percent by weight.

The prepolymer of Example A was found to have: Mn=2575; Mw=3960; z average molecular weight (Mz)=5340; and a polydispersity index (PDI) (i.e., Mw/Mn)=1.54.

EXAMPLE B

A precursor of a pigment dispersant useful in the pigment dispersions of the present invention was prepared from the ingredients enumerated in Table B.

TABLE B

| Ingredients | Parts by weight |
|---|---|
| Charge 1 | |
| glycidyl methacrylate monomer | 49 |
| isobutyl methacrylate monomer | 128 |
| methyl isobutyl ketone | 125 |
| t-amylperoxy(2-ethylhexanoate) (d) | 14.3 |
| Charge 2 | |
| prepolymer of Example A (e) | 175 |
| methyl isobutyl ketone | 30 |
| Charge 3 | |
| t-amylperoxy(2-ethylhexanoate) (d) | 1.4 |
| methyl isobutyl ketone | 20 |

(d) LUPEROX ® 575 is a free radical initiator obtained commercially from Elf Atochem.
(e) Having a resin solids content of 59.5 percent by weight, based on total weight.

Charge 1 was added to an addition funnel. Charge 2 was added to a 2 liter 4-necked flask equipped with a motor driven stainless steel stir blade, water cooled condenser, and a heating mantle and thermometer connected through a temperature feed-back control device. A dry nitrogen sweep was passed continuously through the flask throughout the course of the reaction. The contents of the flask were heated to 110° C., and Charge 1 was added over a period of 3 hours, followed by an additional 1 hour hold at 110° C. The reaction was then cooled to 80° C. and Charge 3 was dumped into the flask, followed by a 2 hour hold at 80° C. The contents of the flask were cooled, methyl isobutyl ketone was removed by vacuum distillation, and the resin was dissolved in 2-butoxyethanol to a resin solids of 49 percent by weight, based on total weight. The epoxy equivalent weight was measured to be 1845.

The polymer of Example B was found to have: Mn=2377; Mw=7358; z average molecular weight (Mz)=18,150; and a polydispersity index (PDI) (i.e., Mw/Mn)=3.10.

EXAMPLE C

The precursor pigment dispersant of Example B was modified to form a pigment dispersant useful in the present invention as summarized in Table C.

TABLE C

| Ingredients | Parts by weight |
|---|---|
| precursor pigment dispersant of Example B (f) | 500 |
| para-nitrobenzoic acid | 45 |
| ethyltriphenylphosphonium iodide catalyst | 0.8 |

(f) Having a resin solids content of 49 percent by weight, based on total weight.

The ingredients listed in Table C were added to a 1 liter round bottom flask equipped with a motor driven stainless steel stir blade, water cooled reflux condenser, and a heating mantle and thermometer connected through a temperature feed-back control device. The contents of the flask were heated to and held at 110° C. for 11 hours under a dry nitrogen sweep. The reaction was cooled and the pH of the solution was adjusted to 8.1 with 10.6 grams of dimethylethanolamine.

Pigment Dispersion Example

A pigment dispersion according to the present invention, was prepared using the ingredients enumerated in Table 1.

TABLE 1

| Ingredients | Parts by weight |
|---|---|
| pigment dispersant of Example C | 194 |
| defoamer (g) | 3.1 |
| 2-butoxyethanol solvent | 60 |
| chlorinated copper phthalocyanine blue pigment (h) | 49 |
| aqueous dimethylethanolamine (i) | 0.5 |
| deionized water | 66 |

(g) BYK 031 defoamer from Byk-Chemie.
(h) B-4816 Palomar Blue chlorinated copper phthalocyanine blue pigment obtained from Bayer.
(i) 50 percent by weight dimethylethanolamine in deionized water.

The pigment dispersant of Example C, defoamer, 2-butoxyethanol and deionized water were mixed in a stainless steal beaker using a cowles blade for approximately 10 minutes. The chlorinated copper phthalocyanine blue pigment was added to the stainless steal beaker with agitation from the cowles blade. The pH of the contents of the stainless steal beaker was adjusted to a value of 9 by addition of the aqueous dimethylethanolamine, followed by 15 minutes of additional mixing with the cowles blade to form a pre-paste. The pre-paste was then transferred to and ground in an Eiger Mini Motormill 100 (from Eiger Machine, Inc. of Chicago, Ill.). During the grinding process, the temperature of the contents of mill did not rise above 30° C. The pigment dispersion was removed from the mill and had a pigment to pigment dispersant weight ratio of 0.5, and a solids weight of 39 percent by weight, based on the total weight of the pigment dispersion.

The pigment dispersion was found to have a mean particle size of 0.800 microns (as determined using a Coulter LS 230 Particle Size Analyzer from Beckman Coulter Corporation), and a haze value of 9.40 percent (as determined using a TCS Plus Spectrophotometer Model 8870 from Byk-Gardner). Mean particle sizes of less than 2 microns and haze values of less than 25 percent are considered generally to be desirable for aqueous pigment dispersions of chlorinated copper phthalocyanine blue pigment having a pigment to pigment dispersant weight ratio of 0.5 and a solids content of approximately 40 percent by weight, based on total weight.

The present invention has been described with reference to specific details of particular embodiments thereof. It is not intended that such details be regarded as limitations upon the scope of the invention except insofar as and to the extent that they are included in the accompanying claims.

We claim:

1. A pigment dispersion comprising:
   (a) pigment;
   (b) an aqueous carrier selected from water and a mixture of water and at least one organic solvent; and
   (c) a pigment dispersant prepared by polymerizing a composition comprising,
      (i) at least one prepolymer having a radically polymerizable group at a head end of said prepolymer and an initiator residue at a tail end, said prepolymer being prepared by controlled radical polymerization of at least one radically polymerizable ethylenically unsaturated first monomer, said prepolymer having a polydispersity index of less than 2.0; and
      (ii) at least one radically polymerizable ethylenically unsaturated second monomer to produce a polymer backbone segment in said pigment dispersant; wherein said prepolymer after polymerization with (c)(ii) is in the form of polymeric segments pendent to said polymeric backbone segment, at least a portion of each pendent polymeric segment is hydrophilic, and the polymeric backbone segment is hydrophobic,
   wherein the pigment dispersant has the following structure:

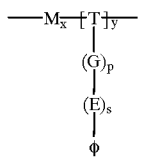

where M represents a residue of the radically polymerizable ethylenically unsaturated second monomer (c)(ii); x is the number of occurrences of M randomly distributed along the polymer chain; T-(E)$_s$-(G)$_p$-Φ represents the prepolymer; y is the number of occurrences of the prepolymer randomly distributed along the polymer chain; T represents the radically polymerizable group at the head end of said prepolymer; E represents a block of hydrophilic residues of at least one radically polymerizable ethylenically unsaturated monomer; G represents a block of residues of one or more monomers selected from the group consisting of methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, alkyl (meth) acrylates having from 6 to 20 carbon atoms in the alkyl group and an oxirane monomer reacted with a carboxylic acid; Φ represents the initiator residue, x and y are selected such that the total weight ratio of the prepolymer (c)(i) to M (c)(ii) is from 1:10 to 10:1; p is from 1 to 300; and s is from 1 to 300.

2. The pigment dispersion of claim 1 wherein said prepolymer is prepared by atom transfer radical polymerization of said first monomer in the presence of an initiator having a radically transferable group, said prepolymer containing a residue of or derived from said initiator.

3. The pigment dispersion of claim 2 wherein said initiator is selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having a radically transferable halide.

4. The pigment dispersion of claim 3 wherein said initiator is selected from the group consisting of halomethane, 1-halo-2,3-epoxypropane, methanesulfonyl halide, methanesulfenyl halide, $C_1$–$C_6$-alkyl ester of 2-halo-$C_2$–$C_6$-carboxylic acid, di($C_1$–$C_6$-alkyl)-2-halo-2-methyl malonate and mixtures thereof.

5. The pigment dispersion of claim 1 wherein said pigment dispersant is prepared by non-living free radical polymerization.

6. The pigment dispersion of claim 1 wherein each of said first and second monomers are independently selected from vinyl monomers, allylic monomers, olefins and mixtures thereof.

7. The pigment dispersion of claim 6 wherein each pendent polymeric segment contains nonionic moieties, ionic moieties and combinations thereof.

8. The pigment dispersion of claim 7 wherein each pendent polymeric segment contains residues of monomers selected independently from the group consisting of poly (alkylene glycol) (meth)acrylates, $C_1$–$C_4$ alkoxy poly (alkylene glycol) (meth)acrylates, hydroxyalkyl (meth) acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

9. The pigment dispersion of claim 8 wherein the carboxylic acid functional monomers are selected from the group consisting of (meth)acrylic acid, maleic anhydride, maleic acid, di($C_1$–$C_4$ alkyl) maleates and mixtures thereof; and the amine functional monomers are selected from the group consisting of amino($C_2$–$C_4$ alkyl) (meth)acrylates, N-($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

10. The pigment dispersion of claim 7 wherein each pendent polymeric segment contains cationic moieties selected independently from ammonium, sulphonium and phosphonium.

11. The pigment dispersion of claim 6 wherein said hydrophobic polymeric backbone segment contains residues of monomers selected from the group consisting of: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_1$–$C_{20}$ alkyl (meth)acrylates; aromatic (meth) acrylates; polycyclicaromatic (meth)acrylates; vinyl esters of carboxylic acids; N,N-di($C_1$–$C_8$ alkyl) (meth) acrylamides; maleimide; N-($C_1$–$C_{20}$ alkyl) maleimides; N-($C_3$–$C_8$ cycloalkyl) maleimides; N-(aryl) maleimides; and mixtures thereof.

12. The pigment dispersion of claim 11 wherein said oxirane functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof; and said carboxylic acid is selected from the group consisting of para-nitrobenzoic acid, hexanoic acid, 2-ethyl hexanoic acid, decanoic acid, undecanoic acid and mixtures thereof.

13. The pigment dispersion of claim 2 wherein said prepolymer has a polydispersity of less than 1.8.

14. The pigment dispersion of claim 1 wherein the hydrophilic portion of each pendent polymeric segment of said pigment dispersant has a calculated average value of 100× (oxygen weight+nitrogen weight)/carbon weight of from 55 to 133; and the hydrophobic polymeric backbone segment of said pigment dispersant has a calculated average value of 100×(oxygen weight+nitrogen weight)/carbon weight of from 10 to less than 55.

15. The pigment dispersion of claim 1 wherein the weight ratio of (c)(i) to (c)(ii) is from 1:5 to 5:1.

16. The pigment dispersion of claim 1 wherein pigment (a) is selected from inorganic pigments, organic pigments and combinations thereof.

17. The pigment dispersion of claim 1 wherein pigment (a) and said pigment dispersant (c) are together present in an amount totaling from 20 percent by weight to 80 percent by weight, based the total weight of said pigment dispersion.

18. The pigment dispersion of claim 17 wherein the weight ratio of pigment (a) to said pigment dispersant (c) is from 0.1:1 to 100:1.

19. The pigment dispersion of claim 1 wherein pigment (a) is present in an amount of from 0.5 percent to 90 percent by weight, based on total weight of said pigment dispersion, said aqueous carrier (b) is present in an amount of from 5 percent to 99.4 percent by weight, based on total weight of said pigment dispersion, and said pigment dispersant (c) is present in an amount of from 0.1 percent to 65 percent by weight, based on total weight of said pigment dispersion.

20. The pigment dispersion of claim 1 wherein E is a residue of at least one monomer selected from the group consisting of poly(alkylene glycol) (meth)acrylates, $C_1$–$C_4$ alkoxy poly(alkylene glycol) (meth)acrylates, hydroxyalkyl (meth)acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof; and G is a residue of a monomer selected from the group consisting of methyl (meth)acrylate, ethyl (meth)acrylate, propyl (meth)acrylate, isopropyl (meth)acrylate, n-butyl (meth) acrylate, isobutyl (meth)acrylate, tert-butyl (meth)acrylate and mixtures thereof.

21. The pigment dispersion of claim 20 wherein E has cationic moieties selected from ammonium, sulphonium and phosphonium.

22. The pigment dispersion of claim 21 wherein said initiator is selected from the group consisting of 1-halo-2, 3-epoxypropane, methanesulfonyl halide, methanesulfenyl halide, $C_1$–$C_6$-alkyl ester of 2-halo-$C_2$–$C_6$-carboxylic acid, di($C_1$–$C_6$-alkyl)-2-halo-2-methyl malonate and mixtures thereof.

23. The pigment dispersion of claim 22 wherein s is from 1 to 20, and p is from 1 to 20.

24. The pigment dispersion of claim 1 wherein T is selected from the group consisting of (meth)acryloyl, allyl, substituted allyl, vinyl and thiol.

25. The pigment dispersant of claim 1 wherein G is a residue of at least one monomer selected from the group consisting of: (i) oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof, (ii) alkyl (meth)acrylates having from 6 to 20 carbon atoms in the alkyl group and (iii) mixtures of (i) and (ii).

26. The pigment dispersion of claim 25 wherein said oxirane functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof; and said carboxylic acid is selected from the group consisting of para-nitrobenzoic acid, hexanoic acid, 2-ethyl hexanoic acid, decanoic acid, undecanoic acid and mixtures thereof.

\* \* \* \* \*